(12) United States Patent
Innanje et al.

(10) Patent No.: US 12,229,954 B2
(45) Date of Patent: Feb. 18, 2025

(54) ANATOMY-AWARE CONTOUR EDITING METHOD AND SYSTEM FOR IMPLEMENTING SAID METHOD

(71) Applicant: Shanghai United Imaging Intelligence Co., LTD., Shanghai (CN)

(72) Inventors: Arun Innanje, Cambridge, MA (US); Xiao Chen, Cambridge, MA (US); Shanhui Sun, Cambridge, MA (US); Zhanhong Wei, Cambridge, MA (US); Terrence Chen, Cambridge, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 351 days.

(21) Appl. No.: 17/953,484

(22) Filed: Sep. 27, 2022

(65) Prior Publication Data
US 2024/0104721 A1    Mar. 28, 2024

(51) Int. Cl.
*G06T 7/00*      (2017.01)

(52) U.S. Cl.
CPC .. *G06T 7/0012* (2013.01); *G06T 2207/10088* (2013.01); *G06T 2207/30048* (2013.01)

(58) Field of Classification Search
CPC ......... G06T 7/0012; G06T 2207/10088; G06T 2207/30048
See application file for complete search history.

(56) References Cited

U.S. PATENT DOCUMENTS

| | | | | |
|---|---|---|---|---|
| 8,077,948 | B2 * | 12/2011 | Gindele | G06T 7/11 |
| | | | | 382/128 |
| 8,351,670 | B2 * | 1/2013 | Ijiri | G06T 19/20 |
| | | | | 382/199 |
| 9,401,021 | B1 * | 7/2016 | Biagiotti | G06T 7/0014 |
| 9,779,504 | B1 * | 10/2017 | Biagiotti | G06T 11/60 |
| 11,064,979 | B2 * | 7/2021 | Lieblich | A61B 8/467 |
| 2005/0123197 | A1 | 6/2005 | Tank | |
| 2007/0116335 | A1 * | 5/2007 | Capolunghi | G06T 7/12 |
| | | | | 382/128 |
| 2013/0034276 | A1 * | 2/2013 | Hibbard | G06T 17/30 |
| | | | | 382/128 |

(Continued)

FOREIGN PATENT DOCUMENTS

| | | | | |
|---|---|---|---|---|
| CN | 113096213 A | * | 7/2021 | ........ G06T 11/203 |
| CN | 109712252 B | * | 7/2023 | |

(Continued)

*Primary Examiner* — Ted W Barnes
(74) *Attorney, Agent, or Firm* — Zhong Law, LLC (57) ABSTRACT

An anatomy-aware contouring editing method includes receiving an image, wherein the image represents an anatomically recognizable structure; identifying a first image segment representing part of the anatomically recognizable structure; annotating the first image segment to generate a label of the part; drawing a contour along a boundary of the part; receiving a first input from a user device indicative of a region of contour failure, wherein the region of contour failure includes a portion of a contour that requires editing; editing the contour for generating an edited contour based on the first input and anatomical information; and updating another contour of another part of the anatomically recognizable structure based on the edited contour, wherein the another part is anatomically related to the part.

20 Claims, 5 Drawing Sheets

(56) References Cited

U.S. PATENT DOCUMENTS

| | | | | |
|---|---|---|---|---|
| 2015/0089337 | A1* | 3/2015 | Grady | G16H 30/40 |
| | | | | 715/202 |
| 2016/0093110 | A1* | 3/2016 | Waschbusch | G06T 19/00 |
| | | | | 382/131 |
| 2018/0214086 | A1* | 8/2018 | Park | A61B 90/37 |
| 2018/0218502 | A1* | 8/2018 | Golden | G06T 7/11 |
| 2018/0259608 | A1* | 9/2018 | Golden | G01R 33/56308 |
| 2019/0035084 | A1* | 1/2019 | Zhou | G06T 7/12 |
| 2020/0085382 | A1* | 3/2020 | Taerum | G06T 7/0016 |
| 2020/0380675 | A1* | 12/2020 | Golden | G06T 7/143 |
| 2021/0216822 | A1* | 7/2021 | Paik | G16H 15/00 |
| 2022/0108540 | A1* | 4/2022 | Lamash | G06T 19/20 |
| 2022/0401074 | A1* | 12/2022 | Lieblich | G06T 7/50 |
| 2023/0100255 | A1* | 3/2023 | Gooding | G06T 7/10 |
| | | | | 382/128 |
| 2024/0177836 | A1* | 5/2024 | Paik | G06T 7/0012 |
| 2024/0331140 | A1* | 10/2024 | Prasad | G06V 10/82 |

FOREIGN PATENT DOCUMENTS

| | | | | | |
|---|---|---|---|---|---|
| CN | 117557591 | A | * | 2/2024 | |
| DE | 10357206 | A1 | | 7/2005 | |
| EP | 1183649 | B1 | * | 11/2003 | G06T 11/203 |
| EP | 2736016 | B1 | * | 2/2019 | A61B 6/469 |
| GB | 2611602 | A | * | 4/2023 | A61B 5/0033 |
| JP | 2012014360 | A | * | 1/2012 | G06T 19/20 |
| JP | 2023057013 | A | * | 5/2023 | |
| WO | WO-2007069141 | A1 | * | 6/2007 | G06T 11/60 |
| WO | WO-2017091833 | A1 | * | 6/2017 | G01R 33/5608 |
| WO | WO-2018108933 | A1 | * | 6/2018 | G06T 11/20 |

\* cited by examiner

ANATOMY-AWARE CONTOUR EDITING METHOD AND SYSTEM FOR IMPLEMENTING SAID METHOD

FIELD

The aspects of the disclosed embodiments relate generally to the field of image processing, and more specifically, to anatomy-aware contour editing.

BACKGROUND

Conventionally, magnetic resonance imaging (MRI) employs a magnetic resonance (MR) scanner to capture time series image of a body of a living being using a powerful magnetic field, radio waves and a computer. Herein, the time series image comprises a set of images captured in succession in time, such as, for example, a number of images in the set of images may be hundred. The time series image is used by doctors to monitor functioning of the body, such as, for example, a cardiac state at any time instant. This is used to further detect diseases related to poor functioning of the body. The time series image is further segmented to monitor different parts within the organs, such as, left ventricle, right ventricle, and papillary muscles of the heart. Upon segmenting the different parts within the organs, a contour is drawn along a boundary of the parts of the organs to extract useful information from the time series image. This facilitates future studies relating to functioning of the parts of the organs in a detailed manner. However, the contours drawn are not always precise in nature and may require editing.

Firstly, two-dimensional (2D) contour editing methods are used to edit the contours and make them accurate. However, the 2D contour editing method is typically performed manually, wherein a user manually annotates the parts of the organs that are segmented, and then verifies correctness of the contours. This is a time-consuming process. Furthermore, the 2D contour editing method can be performed using automated methodology, wherein said methodology performs segmentation of the parts of the organs automatically. However, the contours still need to be verified and edited manually for anatomical accuracy. Hence, the user has to manually perform segmentation, annotation, and draw contours of the parts of the organs, for each image in the set of images. Hence, on an average, the user has to verify the contours in almost hundred images. This is time-consuming, inefficient, and inaccurate.

Secondly, conventional methods of editing a given contour employs user interface (UI) based interactive tools. These tools edit a portion of the given contour by dynamically selecting a control point. This control point is used to adjust a neighborhood of the given contour by either adding or removing certain portions of the parts of the organs. Typically, the given contour can be smoothened using a conventional function, such as, for example a Bezier function. Additionally, curve interpolation techniques are applied to smoothen the given contour further. In some instances, the control points are predefined on a polygon encompassing an outline of the parts of the organ, and the given contour is edited only between two consecutive control points. When the contour is edited in this manner, the user needs to continuously interact with the contours and need to make fine adjustments to accurately edit the given contour. This is prone to error, and time-consuming in nature.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Methods, systems and/or computer program products are provided to implement anatomy-aware contour editing method, substantially as shown in and/or described in connection with at least one of the figures, as set forth more completely in the claims.

According to a first implementation form, the aspects of the disclosed embodiments are directed to an anatomy-aware contour editing method. In one embodiment, the method includes receiving, by at least one processor, at least one image, wherein the at least one image represents at least one organ. The method also includes, identifying, by the at least one processor, a first image segment represents at least one part of the at least one organ, and annotating, by the at least one processor, the first image segment to generate a label of the at least one part. The method also includes, drawing, by the at least one processor, at least one contour along a boundary of the at least one part. The method also includes, receiving, by the at least one processor, a first input indicative of a region of contour failure, and wherein the region of contour failure includes a portion of a contour that requires editing. The method also includes, editing, by the at least one processor, the contour for generating an edited contour, based on the first input and anatomical information. The method also includes, updating, by the at least one processor, another contour of another part of the at least one organ based on the edited contour, wherein the another part is anatomically related to the at least one part.

According to a second possible implementation form, the aspects of the disclosed embodiments are directed to a system for implementing an anatomy-aware contour editing method. In one embodiment, the system includes a user device and at least one processor. The at least one processor is configured to receive at least one image, wherein the at least one image represents at least one anatomically recognizable structure. The at least one processor is also configured to identify a first image segment representing at least one part of the at least one anatomically recognizable structure, and to annotate the first image segment to generate a label of the at least one part. The at least one processor is also configured to draw at least one contour along a boundary of the at least one part. The at least one processor is also configured to receive a first input indicative of a region of contour failure, wherein the region of contour failure includes a portion of a contour that requires editing. The at least one processor is also configured to edit the contour to generate an edited contour, based on the first input and anatomical information. The at least one processor is also configured to update another contour of another part of the at least one anatomically recognizable structure based on the edited contour, wherein the another part is anatomically related to the at least one part.

According to a third possible implementation form, the aspects of the disclosed embodiments are directed to a computer program product for implementing an anatomy-aware contour editing method. In an embodiment, the computer program product comprises non-transitory computer-readable program instructions, which when executed by a hardware processor of a computing device, are configured to cause the computing device to implement the anatomy-aware contour editing method according to the first possible implementation form.

These and other advantages, aspects, and novel features of the present disclosure, as well as details of an illustrated embodiment thereof, will be more fully understood from the following description and drawings.

DETAILED DESCRIPTION OF THE DISCLOSED EMBODIMENTS

The various aspects of the disclosed embodiments provide a method, a system, and a computer program product that may correspond to a solution that utilizes a workflow to edit and verify the contours efficiently. Conventional techniques of editing the contour involves manually annotating and verifying the contours. However, such techniques are time-consuming and tedious. Furthermore, automated mechanisms can be used to segment parts of an anatomically recognizable structure. However, it is still required to manually verify and correct improperly drawn contours. In contrast, the anatomy-aware contour editing method of the disclosed embodiments provides an improved workflow for editing the contour using inputs from a user associated with a user device, and anatomical information. Hence, said method makes editing, verifying and correcting the contours efficiently and in an interactive manner.

Figure 1:
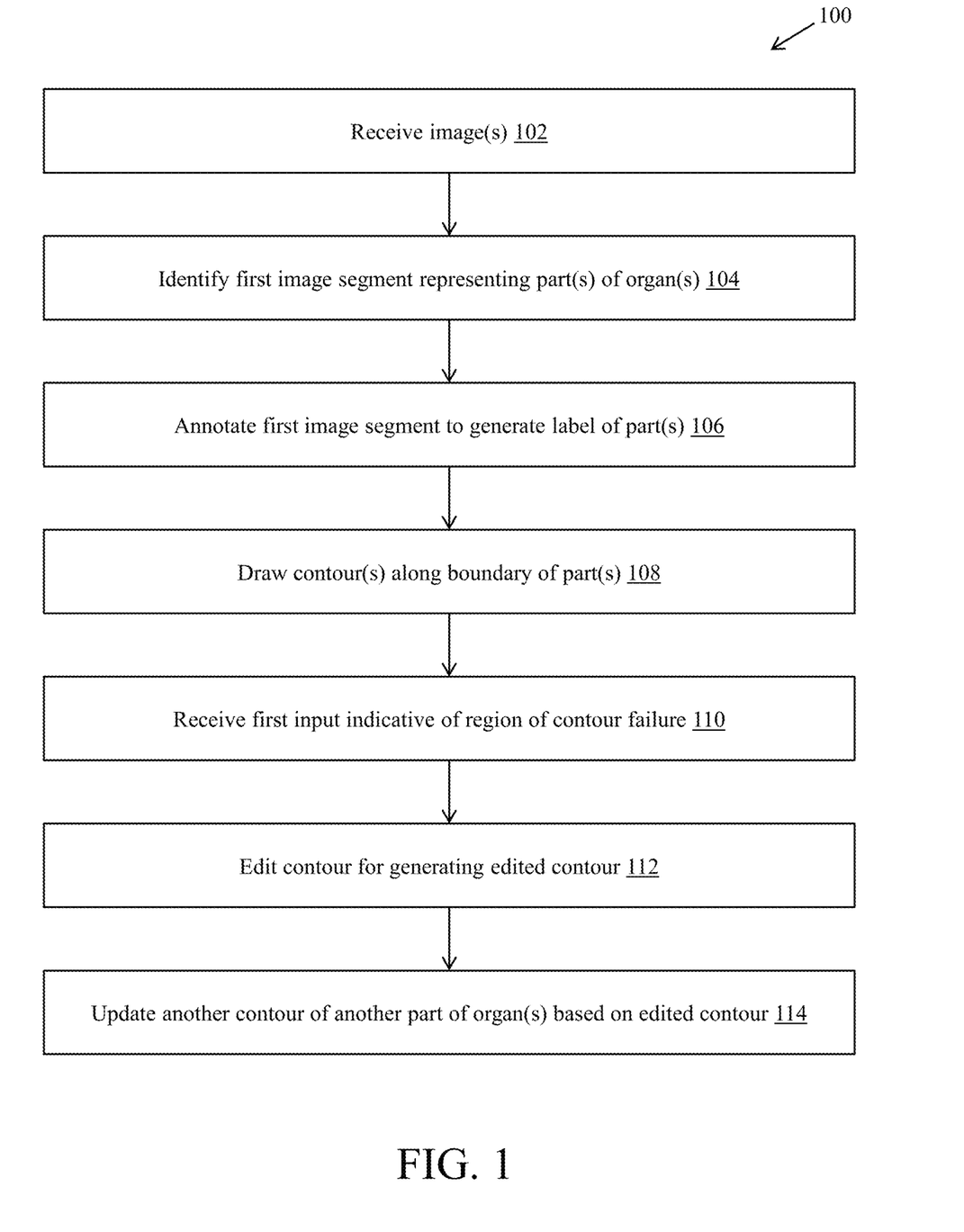
FIG. 1 is a flowchart that illustrates steps of an anatomy-aware contour editing method in accordance with an embodiment of the present disclosure.

Referring to FIG. 1, the aspects of the disclosed embodiments are generally directed to an anatomy-aware contour editing method. In one embodiment, the method includes receiving at least one image. The at least one image represents at least one anatomically recognizable structure. A first image segment representing at least one part of the at least one anatomically recognizable structure is identified. The first image segment is annotated to generate a label of the at least one part. At least one contour along a boundary of the at least one part is drawn. A first input indicative of a region of contour failure is received, the first input being provided using a user device. The region of contour failure includes a portion of a contour that requires editing. The contour is edited based on the first input and anatomical information. A contour of another part of the at least one anatomically recognizable structure is updated based on the edited contour. The another part is anatomically related to the at least one part.

The anatomy-aware contour editing method 100 introduces an efficient way of editing the contour for generating an edited contour, and subsequently updating the another contour based on the edited contour. The anatomy-aware contour editing method 100 is described in detail in following steps.

At step 102, the anatomy-aware contour editing method 100 comprises receiving, by the at least one processor, at least one image, wherein the at least one image represents at least one anatomically recognizable structure. Herein, the at least one image is a three-dimensional (3D) detailed anatomical image received by using magnetic resonance imaging (MRI), wherein the MRI is performed by subdividing a section of a patient's body. It will be appreciated that the term "at least one image" refers to a "a single image" in some implementations, and to a "a plurality of images" in other implementations. The single image is captured at a single instant of time from a particular pose of a medical imaging device used for performing the MRI. The plurality of images are captured in time series. Furthermore, the plurality of images are captured along different standard orientations of the camera which helps to get a better view of the at least one anatomically recognizable structure in the patient's body. Herein, the term "anatomically recognizable structure" refers to a structure that is anatomically correct and recognizable. Herein, the anatomically recognizable structure is an organization of different kinds of tissues at a particular location within the body of the living being, which are arranged to perform a specific function pertaining to the patient or a living being. Examples of the anatomically recognizable structure may include, but are not limited to, an organ, a tissue, a lesion, and the like.

It will be appreciated that a given image is a visual representation of the at least one anatomically recognizable structure of the living being. The term "visual representation" encompasses colour information represented in the given image, and additionally optionally other attributes associated with the given image (for example, such as density information, movement related information, tissue information, and the like). The given image is composed of a plurality of pixels. Example of greyscale with colour information include, but is not limited to, pixel colours ranging from white to black, including several shades of grey.

Optionally, the given image is at least one of: a radiograph image, a sonogram, a positron emission tomography (PET) scan. The radiograph image represents the at least one anatomically recognizable structure in greyscale, and is captured using X-ray energy, i.e., a packet of electromagnetic energy. The radiograph image is used to assess presence or absence of at least one: a disease, a foreign object, a structural anomaly or damage, of the at least one anatomically recognizable structure. The sonogram is captured using high-frequency sound waves of an ultrasound device, to view the at least one anatomically recognizable structure. Furthermore, the sonogram is able to portray movement of internal organs along with flow of blood through blood vessels of the body, by capturing the sonogram in real-time or near real-time. The PET scan is used to assess metabolic and biochemical function of the tissues and the at least one anatomically recognizable structure. The PET scan uses small amounts of radioactive material (i.e., a radiotracer) that is intravenously injected and travels through the blood, and is collected in organs and tissues, thus visualising said organs and tissues further. For example, a parasternal short axis scan may represent a heart of a given living being.

Optionally, the at least one image captured using any of: a Computed Tomography (CT) exam, a fluoroscopy exam, a radiography exam, an ultrasound exam, a MRI imaging, a PET scan, and the like, is received by at least one processor in real-time or near real-time (without any latency/delay). The term "processor" relates to a computational element that is operable to respond to and process instructions. The at least one processor, in operation, implements the anatomy-aware contour editing method. Furthermore, the term "processor" may refer to one or more individual processors, processing devices and various elements associated with the processing device that may be shared by other processing devise. Such processors, processing devices and elements may be arranged in various architectures for responding to and executing steps of the method.

Optionally, the at least one image can be received from a data repository using at least one processor, wherein the data repository is communicably coupled to the at least one processor. Throughout the present disclosure, the term "processor" relates to a computational element that is operable to respond to and process instructions. The at least one processor, in operation, implements the steps of the anatomy-aware contour editing method. Furthermore, the term "processor" may refer to one or more individual processors, processing devices and various elements associated with a processing device that may be shared by other processing devices. Such processors, processing devices and elements may be arranged in various architectures for responding to and executing the steps of the anatomy-aware contour editing method.

At step 104, the anatomy-aware contour editing method 100 comprises identifying, by the at least one processor, a first image segment representing at least one part of the at least one anatomically recognizable structure. Throughout the present disclosure, the term "image segment" of a given image refers to a portion (namely, a segment) of the given image that represents at least one part of the at least one anatomically recognizable structure. The first image segment can be of any shape, such as, for example, a circular shape, an elliptical shape, a polygonal shape, a freeform, and the like. Herein, aforementioned method further comprises optionally cropping the first image segment from the given image, wherein the first image segment represents at least one part of the at least one anatomically recognizable structure. The first image segment provides a virtual dissection of the at least one anatomically recognizable structure to reveal a true at least one part of the at least one anatomically recognizable structure. It will be appreciated that each pixel in the given image represents a given part that can be identified into a class and the given part is identifiable unambiguously. The given image is made up of points that are rendered as pixels, and each pixel of the given image is identified from a predefined set of classes, such as a right ventricle, a left ventricle myocardium, at least one papillary muscle. The first image segment can be identified by at least one of: classifying a single pixel that represents the at least one part, classifying a plurality of pixels that represent the at least one part, classifying each pixel based on its neighbouring pixels. The first image segment can be identified manually by visually inspecting the given image, or automatically using computer-based algorithms, and/or a combination of both. A technical effect of identifying the first image segment is to accurately diagnose problem areas in the at least one part of the at least one anatomically recognizable structure, and suggest a treatment plan if the living being is unwell.

For example, a given image may represent a heart, wherein the given image may be composed of 1000 pixels. The at least one part of the heart may be at least one of: a right ventricle, a left ventricle myocardium, a left ventricle epicardium, a left ventricle endocardium, and left ventricle papillary muscles. Subsequently, an image segment is identified, wherein 250 pixels may be attributed as the right ventricle, 350 pixels may be attributed as the left ventricle myocardium, 150 pixels may be attributed as the left ventricle epicardium, 150 pixels may be attributed as the left ventricle endocardium, and 100 pixels may be attributed as the left ventricle papillary muscles.

At step 106, the anatomy-aware contour editing method 100 comprises annotating, by the at least one processor, the first image segment to generate a label of the at least one part. The first image segment is annotated to record the first image segment. Herein, the annotation is performed to label or classify the first image segment using text, or a drawing or both, to show features that can be used to identify successive image segments, when the at least one image is a plurality of images, captured successively over a period of time. The annotation may be either performed manually by a person, or by using a computer, wherein the annotation may be performed automatically using the computer or semi-automatically using a combination of the computer and manual input from the person. Subsequently, a label of the at least one part is generated, wherein the label provides an indication of the at least one part. Referring to and continuing with the first example, the image segment representing the at least one of: the right ventricle may be annotated to represent "RV", the left ventricle myocardium may be annotated to represent "LV myocardium", the left ventricle endocardium may be annotated to represent "LV endocardium", the left ventricle papillary muscles may be annotated to represent "LV papillary muscles". Herein, "RV", "LV myocardium", "LV endocardium", and "LV papillary muscles" may be the labels that are generated upon annotating the image segment.

At step 108, the anatomy-aware contour editing method 100 comprises drawing, by the at least one processor, at least one contour along a boundary of the at least one part. The at least one contour is drawn along the boundary (or edge), so as to extract said boundary of the at least one part in the first image segment. Beneficially, the at least one contour is used for evaluating a functioning of the at least one part of the at least one anatomically recognizable structure. The term "contour" refers to a line joining all continuous points along the boundary of the at least one part that have same colour and intensity throughout the first image segment, and thereby forming a closed curve. The at least one contour can be drawn manually, automatically, or a combination of both. The at least one contour is drawn to separate the at least one part of the at least one anatomically recognizable structure visually, and to precisely define features of the at least one part. The at least one contour is drawn using techniques well-known in the art. The at least one contour is drawn to overcome an issue of weak or blurred boundaries of the at least one part of the at least one anatomically recognizable structure, thereby accurately extracting the boundaries of the at least one anatomically recognizable structure. Beneficially, the at least one contour is useful for analysing a shape of the at least one part, determining a size of the at least one part, and in detecting anomaly in the at least one part. Furthermore, a size and shape of the at least one contour drawn along the boundary of the at least one part helps to determine any underlying disease in the body of the living being.

At step 110, the anatomy-aware contour editing method 100 comprises receiving, by the at least one processor, a first input indicative of a region of contour failure, the first input being provided using a user device, and wherein the region of contour failure includes a portion of a contour that requires editing. Throughout the present disclosure, the phrase "region of contour failure" refers to a portion of the contour which is incorrectly drawn such that it does not include the at least one part correctly. This occurs when the at least one contour is not adjusted along the boundary of the at least one part, for example, such as when the at least one part of the at least one anatomically recognizable structure shifts from a given position to another given position. The region of contour failure may show up when there is a change in position of the at least one part, or a change in condition (i.e., a state) of the at least one anatomically recognizable structure. The region of contour failure is received as the first input in real time or in near-real time, and can be edited using computer-aided tools. For example, a medical imaging device may capture multiple images of a beating state of the heart. Hence, any one of the multiple images may represent the heart when the heart is at least partially contracting (i.e., systolic), and another of the multiple images may represent the heart when the heart is at least partially relaxing (i.e., diastolic).

At step 112, the anatomy-aware contour editing method 100 comprises editing, by the at least one processor, the contour for generating an edited contour, based on the first input and anatomical information. Herein, the term "edited contour" refers to that contour which correctly identifies a at least one part of the at least one anatomically recognizable structure, and draws the boundary along the at least one part correctly. Upon receiving the first input, the portion of the contour that is improperly drawn is known. The portion of the contour that is to be edited is manipulated through actions performed on the portion of the contour. Examples of such action may include, but are not limited to, deleting, cropping, pasting, copying, the portion of the contour. The edited contour can be generated using computer vision techniques, which are well-known in the art. The editing can be done in an interactive manner, wherein the region of contour failure is edited automatically, based on inputs received from the user device. The region of contour failure can be edited manually, automatically, or a combination of both. Additionally, the editing can be performed by at least one of: explicit selection, implicit selection, of the contour of the at least one part. The explicit selection of the contour is performed by using selection tools provided by an editing tool. Examples of such selection tools may include, but are not limited to, rotate, translate, add, delete and deform contours. Herein, the term "editing tool" refers to a utility or a program that is used to edit the contour. The implicit selection of the contour is performed by directly interacting with the contour by a user associated with the user device, to edit the contour.

In accordance with an embodiment, the anatomical information is accessed from the data repository whereat the anatomical information is stored. The data repository can be used to pre-store the at least one image digitally for using said image at a later time. The term "data repository" refers to hardware, software, firmware, or a combination of these for storing the at least one image. It will be appreciated that the data repository could be implemented as a cloud-based memory, a memory of the at least one server, a memory of the computing device, a local memory of a user device, a removable memory, or similar. Optionally, the at least one image can be received from the medical imaging device, wherein the medical imaging device comprises at least one camera for capturing at least one image of the at least one anatomically recognizable structure. Herein, the at least one camera can be either at a fixed pose, or different poses. Optionally, the at least one image captured by the medical imaging device is stored in the data repository and retrieved from the data repository whenever required.

In accordance with another embodiment, the anatomical information comprises at least one of: a dimension, a thickness value, a boundary, a relative size, a predefined size threshold, an arrangement, an anatomical relation between any one of a given part and another part with another one of the given part and the another part, of the at least one part of the at least one anatomically recognizable structure. Throughout the present disclosure, the term "anatomical information" refers to pre-known information regarding the at least one of: the at least one part, the at least one anatomically recognizable structure. The anatomical information is used to characterize the at least one part of the at least one anatomically recognizable structure, and the at least one organ. Herein, the anatomical information is an identification and a description of the at least one part of the at least one anatomically recognizable structure. The term "dimension" refers to a measurable extent of the given part, such as, length, breadth, depth, or height. The term "thickness value" refers to a value of distance through the at least one part and/or the at least one anatomically recognizable structure. The term "relative size" refers to a size of the at least one of: a given part of a given anatomically recognizable structure, the given anatomically recognizable structure in comparison to at least one of: another given part of another given anatomically recognizable structure, the another given anatomically recognizable structure. The term "predefined size threshold" refers to pre-known value of size of the at least one part of the at least one anatomically recognizable structure. The term "arrangement" refers to a biological organisation of the at least one part of the at least one anatomically recognizable structure in the body of the living being. The term "anatomical relation" refers to an association or connection between any one of the given part and the another part with another one of the given part and the another part.

Furthermore, the anatomical information also includes at least one of: an appearance and a position of the at least one anatomically recognizable structure, an appearance and a position the at least one part of the at least one anatomically recognizable structure, a material from which the at least one part and/or the at least one anatomically recognizable structure is composed of, an ontological relationship between any one of the at least one part and the at least one anatomically recognizable structure with another one of the at least one part and the at least one anatomically recognizable structure, a function of the at least one part and the at least one anatomically recognizable structure, a chemical process involved, an interconnection between any one of the at least one part and the at least one anatomically recognizable structure with another one of the at least one part and the at least one anatomically recognizable structure. Optionally, the anatomical information also includes information about anatomy of at least one other anatomically recognizable structure that is not represented in the at least one image.

Subsequently, the anatomical information is used to edit the contour so that the edited contour is anatomically accurate. Specifically, the edited contour follows basic rules of an anatomy of the living being, such that the at least one part is represented in the first image segment corresponding to a biological position of said part in the body. Consequently, the edited contour generated based on the first input and the anatomical information is a smooth structure.

In accordance with an embodiment, the step of editing the contour to generate the edited contour comprises:

receiving, by the at least one processor, a second input indicative of a control point, the second input being provided using a user device, and wherein the control point lies either outside the contour or inside the contour;

receiving, by the at least one processor, a third input indicative of a control radius of a circular region of control that is centred at the control point, the third input being provided using a user device, and wherein the circular region of control includes at least a portion of the region of contour failure;

receiving, by the at least one processor, a fourth input indicative of two farthest points on the contour from the control point, the fourth input being provided using a user device, and wherein the two farthest points lie within the portion of the region of contour failure;

drawing, by the at least one processor, a spline from one of the two farthest points to another of the two farthest points through the control point;

replacing, by the at least one processor, the spline with uniformly sampled spline points; and generating, by the at least one processor, the edited contour by adjusting the contour to include the uniformly sampled spline points.

Herein, the second input, the third input, and the fourth input are provided by a user device. Herein, the term "control point" refers to a fixed key point which is selected based on the first input, and helps to resize and edit the contour directly. The control point is one point from amongst a set of points lying along the contour, wherein the set of points are usable to at least determine a shape of the contour. A technical benefit of using the control point is that editing of the contour can be performed in a precise manner, and is highly controllable and efficient as compared to conventional techniques used for editing the contours. The control point is required as the contour was drawn improperly for a given part of a given anatomically recognizable structure, wherein certain portions of the given part are not included (i.e., at least the portion of the region of contour failure) in the contour. The control point is selected in such a manner so as to include or delete, the region of contour failure in an anatomically accurate manner.

Additionally, the second input is received based on a section of the given part in the region of contour failure, that requires editing. In an instance, when the section of the given part in the region of contour failure is to be included, the control point lies outside the contour. In another instance, when the section of the given part on the region of contour failure is to be deleted, the control point lies inside the contour. Subsequently, an area of the section of the given part that is to be included or deleted can be manipulated by changing the control radius of the circular region of control that is centred at the control point. This is received as the third input. The control radius in the third input is selected in a manner so as to generate the edited contour based on the section of the given part which is to be included or deleted. Subsequently, the fourth input is used to ensure a smooth curve of the contour. The fourth input is indicative of the two farthest points, which are selected to include or delete the section of the given part within the region of contour failure. The two farthest points are located on the contour and act as limits, wherein a smaller region of the contour lying within the limits is edited.

Thereafter, the spline is drawn from one of the two farthest point to another of the two farthest point. Herein, the term "spline" refers to a smooth curve that passes through or near a given set of points, wherein the given set of points determine a shape of the spline. The given set of points includes at least one of: the control point, the two farthest points. The spline is drawn using algorithms well-known in the art. The spline is drawn to ensure that the region of contour failure is properly identified, the section of the given part is included or deleted, and that the contour is adjusted accordingly.

Subsequently, the spline is then replaced with uniformly sampled spline points. The uniformly sampled points becomes fixed key points of the edited contour. Herein, the uniformly sampled spline points is linear and positioned at even distances from each other. A technical benefit of replacing the spline with the uniformly sampled spline points is that it ensures a smoother consistency of the edited contour. Consequently, the aforementioned steps are repeated so as to precisely adjust the contour to generate the edited contour. The edited contour will include the uniformly sampled spline points that lies between the two farthest points, and the contour of the at least one part which was drawn previously.

In accordance with an embodiment, the control point emulates a magnet and the control radius is indicative of a strength of an external magnetic field of the magnet. The control radius can be increased or decreased analogous to a magnification factor of the magnet, such as, 0.1×, 0.2×, 0.5×, 1×, 2×, 3×, 4× . . . , N×. In an instance, when the magnification factor of the magnet is high, the strength of the external magnetic field of the magnet is high. Hence, the control radius is high. In another instance, when the magnification factor of the magnet is low, the strength of the external magnetic field of the magnet is low. Hence, the control radius is low. The control radius can be adjusted by the user associated with the user device to perform an action, such as, for example, a mouse can be used to increase or decrease the control radius, by either scrolling up or scrolling down. The contour lying within the two farthest points are attracted towards the control point, just like iron filings are attracted to the magnet. Beneficially, the control radius ensures that the contour is drawn smoothly along a required area of the section of the given part in the region of contour failure.

In accordance with an embodiment, a given input is provided using a user device, the given input being at least one of: a touch input, a click input, a click and drag input, a text input. The given input comprises at least one of: a first input, a second input, a third input, a fourth input. Herein, the term "user device" refers to an electronic device that is capable of at least providing the given input. The user device is associated with (or used by) a user and is capable of enabling the user to perform specific tasks associated with the method. Furthermore, the user device is intended to be broadly interpreted to include any electronic device that may be used to facilitate providing the given input to the user. Examples of the user device include, but are not limited to, a mouse, a touch pad, a key board, a key pad, a joystick etc.

At step 114, the anatomy-aware contour editing method 100 comprises updating, by the at least one processor, another contour of another part of the at least one anatomically recognizable structure based on the edited contour, wherein the another part is anatomically related to the at least one part. The contour is adjusted so as to include the uniformly sampled spline points in the edited contour. This results in a need for a change in the another contour, since the another contour is anatomically related to the edited contour. Hence, the another contour of the another part is updated based on the edited contour, so that the edited contour and the another contour of the another part are consistent with each other, and are anatomically accurate.

In accordance with an embodiment, the at least one anatomically recognizable structure is a heart and the another part of the heart is at least one of: an epicardium, an endocardium. In this regard, the epicardium is an outer protective layer and the endocardium is an innermost layer that lines a plurality of chambers of the heart. The epicardium is an important source of signals to maintain continued growth and differentiate parts when the heart is growing. The endocardium ensures that blood flowing through the heart is separate from other parts of the heart, or cardiac muscles.

In accordance with another embodiment, updating the another contour of the another part comprises:
  identifying, by the at least one processor, a first contour along a boundary of the epicardium and a second contour along a boundary of the endocardium;
  comparing, by the at least one processor, the first contour and the second contour with the anatomical information; and
  when it is determined, based on the comparison, that a relative arrangement of the first contour and the second contour does not match a reference relative arrangement of the epicardium and the endocardium, adjusting, by the at least one processor, at least one of: the first contour, the second contour, to match the reference relative arrangement.

Herein, the first contour along the boundary of the epicardium encompasses the second contour along the boundary of the endocardium, and no overlapping is observed. The first contour and the second contour can be compared either manually, automatically, or a combination of both. The first contour and the second contour are compared to determine whether the first contour is drawn incorrectly with respect to the second contour, in a way such that the first contour encroaches into the second contour, or vice versa. The relative arrangement is a current position of the epicardium and the endocardium, and the reference relative arrangement of the epicardium and the endocardium are obtained from the anatomical information. When the first contour encroaches into the second contour, it means that the epicardium is inside the endocardium, which is anatomically incorrect. Hence, the first contour and the second contour are adjusted based on a corresponding reference relative arrangement of the epicardium and the endocardium, so that the at least one image accurately represents a relative arrangement of the epicardium and the endocardium.

In accordance with another embodiment, the another part of the heart is at least one papillary muscle, and wherein the step of updating the another contour of the another part comprises:
  identifying, by the at least one processor, a third contour polygon of a given papillary muscle; and
  adjusting, by the at least one processor, a size of the third contour polygon based on a predefined size threshold algorithm.

Herein, the at least one papillary muscle is a small muscular structure located in respective ventricles of the heart. The third contour polygon are in a form of tiny islands. Image segmentation is used to locate the at least one papillary muscle and a boundary (for example, such as a line, a curve, and the like) in the at least one image. Thereafter, a label is assigned to every pixel in the at least one image such that pixels with a same label are determined to be the third contour polygon. These pixels share certain characteristics. Subsequently, the size of the third contour polygon is adjusted based on the predefined size threshold algorithm, such as, Otsu's method. The Otsu's method is used to determine the size of the third contour polygon automatically. Herein, the predefined size threshold algorithm searches for a threshold that by minimizing intra-class intensity variance, or equivalently, by maximising inter-class variance.

In accordance with another embodiment, the at least one anatomically recognizable structure is a heart and the another part of the heart is at least one of: a right ventricle epicardium, a left ventricle epicardium. Herein, the right ventricle epicardium is the outer protective layer of the right ventricle, wherein the right ventricle is located in a lower right portion of the heart opposite the left ventricle. Similarly, the left ventricle epicardium is the outer protective layer of the left ventricle, wherein the left ventricle is located in bottom left portion of the heart opposite to the right ventricle.

In accordance with another embodiment, updating the another contour of the another part comprises:
  identifying, by the at least one processor, a first contour polygon of the right ventricle epicardium and the second contour polygon of the left ventricle epicardium, wherein one of the first contour polygon and the second contour polygon overlaps other of the first contour polygon and the second contour polygon;
  determining, by the at least one processor, a first point pair which includes a first point in the first contour polygon and a first point in the second contour polygon, said first points being closest to each other;
  determining, by the at least one processor, a second point pair by traversing along either the first contour polygon or the second contour polygon, wherein the second point pair includes a second point in the first contour polygon and a second point in the second contour polygon, said second points being closest to each other; and
  generating, by the at least one processor, an edited first contour polygon and an edited second contour polygon by adjusting the first contour polygon and the second control polygon based on the first point pair, the second point pair, and the anatomical information.

Herein, attachment of the right ventricle to the epicardium of the heart is used as a reference. The term "contour polygon" refers to a fully enclosed and a continuous contour that emulates the shape of a polygon. In this regard, the polygon could have straight edges, curved edges, freeform edges, and the like. The first contour polygon and the second contour polygon are identified in the at least one image of the heart. In some instances, the first contour polygon and the second contour polygon will not overlap each other. In other instances, one of first contour polygon and the second contour polygon can at least partially overlap another of the first contour polygon and the second contour polygon. Herein, the at least partial overlapping of the first contour polygon and the second contour polygon can be determined manually, automatically, or a combination of both. The first point pair acts like a starting point from where the traversing begins to reaches the second point pair, wherein the second point pair is at a point where the traversing ends. The first point pair and the second point pair are determined only at that instance when there is overlap of one of the first contour polygon and the second contour polygon with another of the first contour polygon and the second contour polygon. The first point pair and the second point pair are determined when the first contour polygon and the second contour polygon are closest to each other. A given point pair can be in a form of coordinates, such as a given first point pair may be ($RV_1$, $LV_1$) and a given second point pair may be ($RV_2$, $LV_2$). Subsequently, a common portion between the first point pair and the second point pair is determined, wherein it is checked whether there is overlapping or not. This common region is continuously updated when the first contour polygon and the second contour polygon is adjusted to make said contour polygons anatomically accurate, thereby generating the edited first contour polygon and the edited second contour polygon.

In accordance with an embodiment, the at least one image is a time-series image, the method further comprising updating at least one succeeding image of the at least one image based on at least one of: the edited contour, the another contour that is updated, wherein the step of updating the at least one succeeding image comprises:

determining, by the at least one processor, at least one of: an affected key point, an affected contour, near the region of contour failure, based on at least one of: the edited contour, the another contour that is updated; and moving, by the at least one processor, at least one of: the affected key point, the affected contour, by a time-based distance in the at least one succeeding image, wherein the time-based distance is a distance that depends on a time interval between the at least one image and the at least one succeeding image.

In this regard, the term "time series image" refers to a set of images consecutively captured by a same pose of the medical imaging device at successive times. The contour of the at least one image is edited based on the first input and the anatomical information. However, the contour is edited only for a first image of the at least one image. Hence, necessary adjustments are made in the at least one succeeding image based on the at least one of: the edited contour, the another contour that is updated, in current time, so as to ensure that a given contour drawn along a boundary of the at least one part in the at least one succeeding image is consistent with a corresponding contour in the first image of the at least one image. In this regard, the affected key point is determined, wherein the affected key point is in a neighbourhood of the at least one of: the edited contour, the another contour that is updated. Herein, the term "affected key point" refers to a key point on the contour which needs to be edited for anatomical accuracy, based on the at least one of: the edited contour, the another contour that is updated. The affected key point need not be anatomically related to the at least one of: the edited contour, the another contour that is updated. Similarly, the affected contour is determined, wherein the affected contour is in the neighbourhood of the at least one of: the edited contour, the another contour that is updated. Herein, the term "affected contour" refers to a part of the contour of the at least one part or the another part that needs to be edited for anatomical accuracy, based on the at least one of: the edited contour, the another contour that is updated. Thereafter, the at least one of: the affected key point, the affected contour are moved by the time-based distance. The time-based distance can be determined using at least one of: a mathematical formula, a mathematical function, which helps in moving at least one of: the affected key point, the affected contour, precisely, by knowing accurate position of the at least one part based on the time. Furthermore, the time interval between the at least one image and the at least one succeeding image can be either fixed or dynamic in nature. For example, a time series image of a beating state of a heart. The affected key point and the affected contour can be manipulated by the user device to verify whether a small region or a large region is affected by the at least one of: the edited contour, the another contour that is updated.

In accordance with an embodiment, the step of updating the at least one succeeding image of the at least one image further comprises copying, by the at least one processor, at least one of: the edited contour, the another contour that is updated, from the at least one image to the at least one succeeding image. This is done to consistently adjust a yet another contour of the at least one succeeding image based on the at least one of: the edited contour, the another contour that is updated, of the at least one image, based on the anatomical information. A technical benefit of copying at least one of: the edited contour, the another contour that is updated, from the at least one image to the at least one succeeding image is to precisely mark the contours in the at least one succeeding image so that the yet another contour is drawn along the boundary of the at least one part in the at least one succeeding image, as was drawn in the at least one image. This ensures that the at least one part in the at least one succeeding image is not mis-identified.

Figure 2:
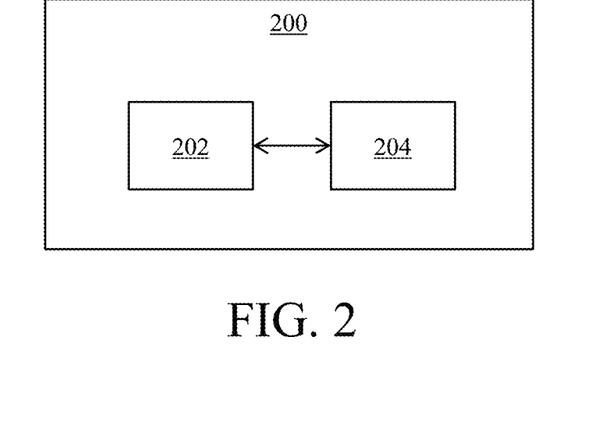
FIG. 2 is a block diagram that illustrates a system for implementing an anatomy-aware contour editing method in accordance with an embodiment of the present disclosure.

FIG. 2 is a block diagram illustrating a system for implementing an anatomy-aware contour editing method, in accordance with an implementation of the present disclosure. With reference to FIG. 2, there is shown a block diagram illustrating a system 200 for implementing an anatomy-aware contour editing method, the system 200 comprises at least one processor (depicted as a processor 202) and a user device 204. The at least one processor 202 is communicably coupled to the user device 204.

Figure 3A:
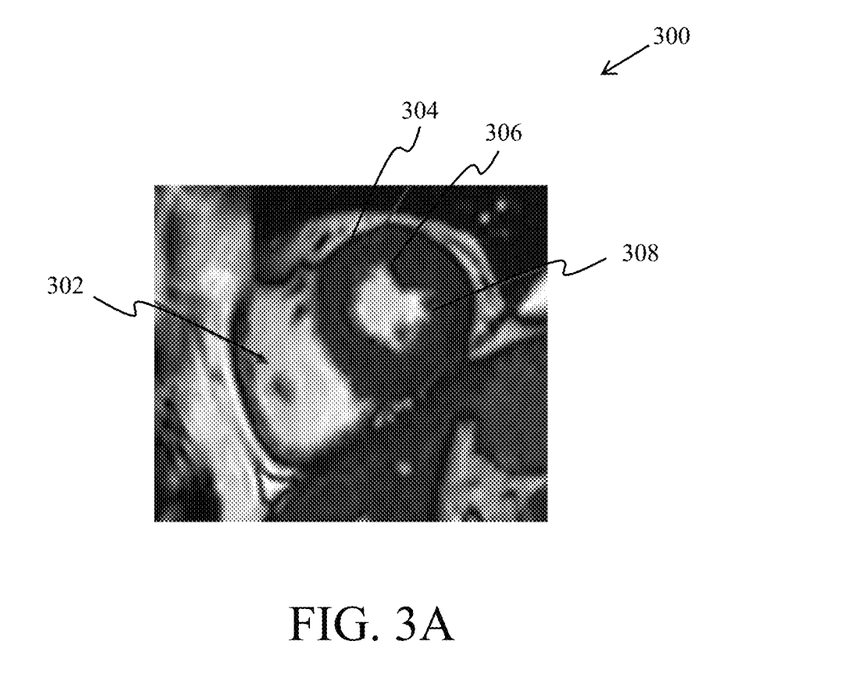
FIGS. 3A and 3B are exemplary images of at least one anatomically recognizable structure in accordance with an embodiment of the present disclosure.
Figure 3B:
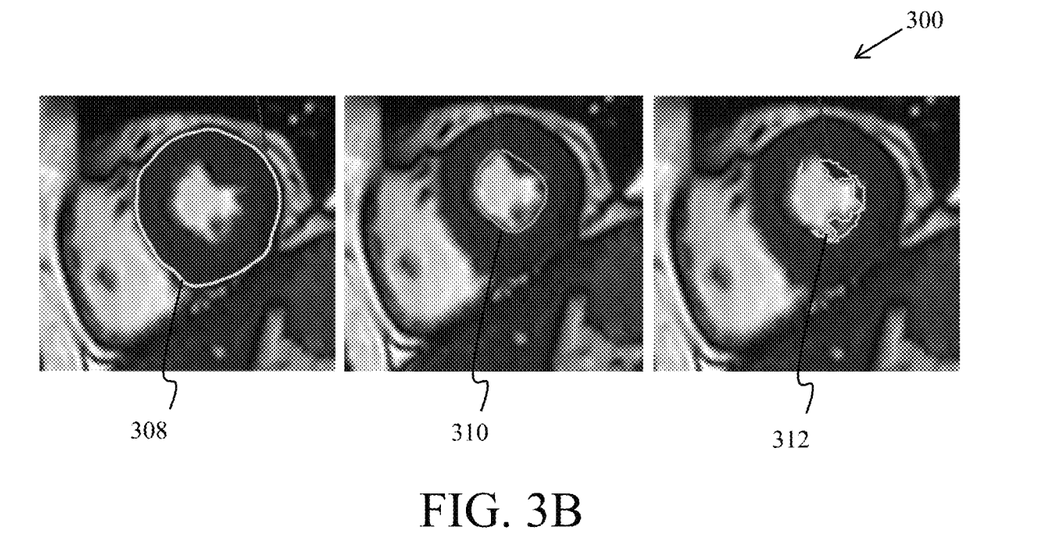

FIGS. 3A and 3B are exemplary images of at least one anatomically recognizable structure, in accordance with an implementation of the present disclosure. With reference to FIG. 3A and FIG. 3B, there is shown an image 300 of at least one anatomically recognizable structure, wherein the at least one anatomically recognizable structure is a heart. In FIG. 3A, a first image segment is identified, wherein the first image segment represents at least one part of the heart. Herein, the at least one part of the heart is at least one of: a right ventricle 302, a left ventricle myocardium 304, a left ventricle endocardium 306, and at least one papillary muscle (depicted as a papillary muscle 308). In FIG. 3B, at least one contour (depicted as contours 310, 312, 314) is drawn along a boundary of the at least one part of the heart. The contour 310 is drawn along the boundary of the left ventricle myocardium 304, the contour 312 is drawn along the boundary of the left ventricle myocardium 306, and the contour 314 is drawn along the boundary of the at least one papillary muscle 308.

Figure 4:
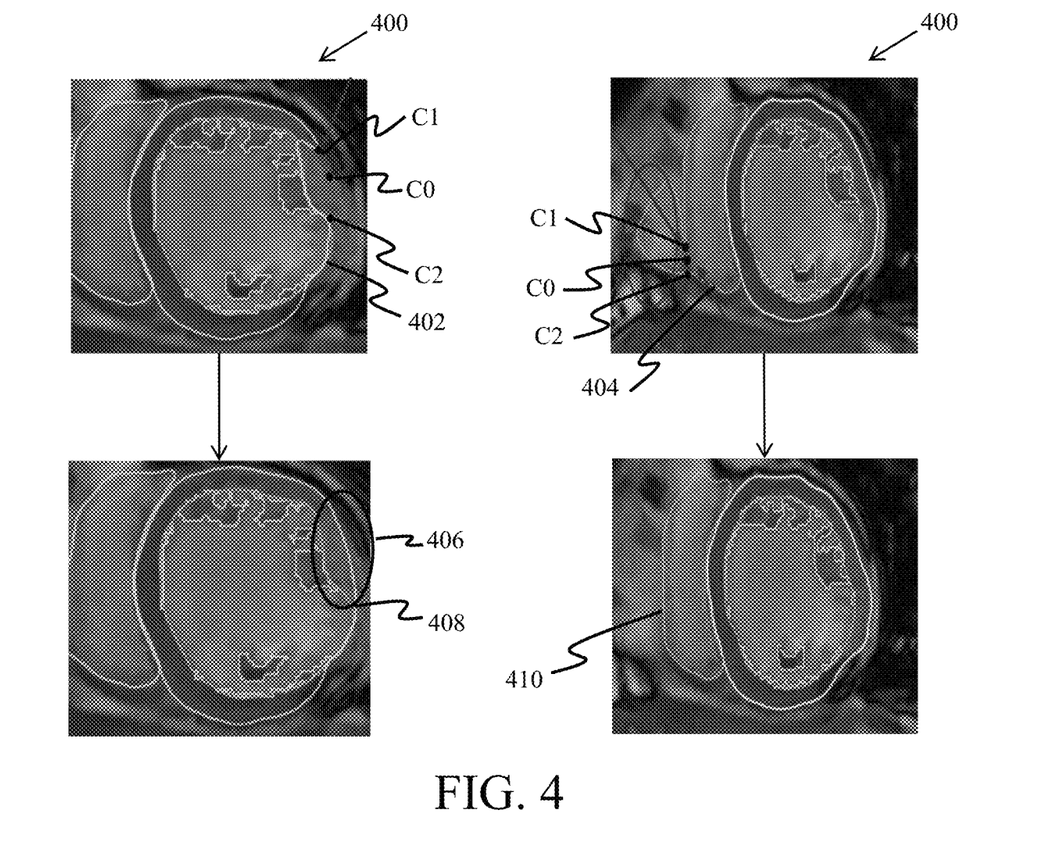
FIG. 4 is an exemplary image of at least one anatomically recognizable structure, wherein the contour is edited to generate an edited contour in accordance with an implementation of the present disclosure.

FIG. 4 is an exemplary image of at least one anatomically recognizable structure, wherein the contour is edited to generate an edited contour, in accordance with an implementation of the present disclosure. With reference to FIG. 4, there is shown an image 400 with a control point C0. This control point C0 lies either outside a given contour 402 or inside another given contour 404. Subsequently, a third input indicative of a control radius (not shown) is determined. Thereafter, the image 400 shows two farthest points C1, C2 on the given contour 402 and on the another given contour 404 from the control point C0. A spline (not shown) is drawn from the two farthest points C1, C2 to another of the two farthest points C1, C2 through the control point C0. Subsequently, the spline is replaced with uniformly sampled spline points (as shown by the encircled region 406). Consequently, an edited contour 408 and another edited contour 410 are generated by adjusting the given contour 402 and the another given contour 404 to include the uniformly sampled spline points 406.

In accordance with an embodiment, when editing the contour 402, 404 for generating the edited contour 408, 410, the at least one processor is configured to implement the anatomy-aware contour editing method. Firstly, a second input indicative of the control point C0 is received, wherein the control point C0 lies either outside the contour 402, 404 or inside the contour 402, 404. Secondly, a third input is received which is indicative of the control radius of the circular region of control that is centered at the control point C0, wherein the circular region of control includes at least a portion of the region of contour failure. Thirdly, a fourth input is received which is indicative of the two farthest points C1, C2 on the contour 402, 404 from the control point C0, wherein the two farthest points C1, C2 lie within the portion of the region of contour failure. Fourthly, the spline is drawn from one of the two farthest points C1, C2 to another of the two farthest points C1, C2 through the control point C0. Fifthly, the spline is replaced with the uniformly sampled spline points 406. Finally, the edited contour is generated by adjusting the contour to include the uniformly sampled spline points 406.

Figure 5:
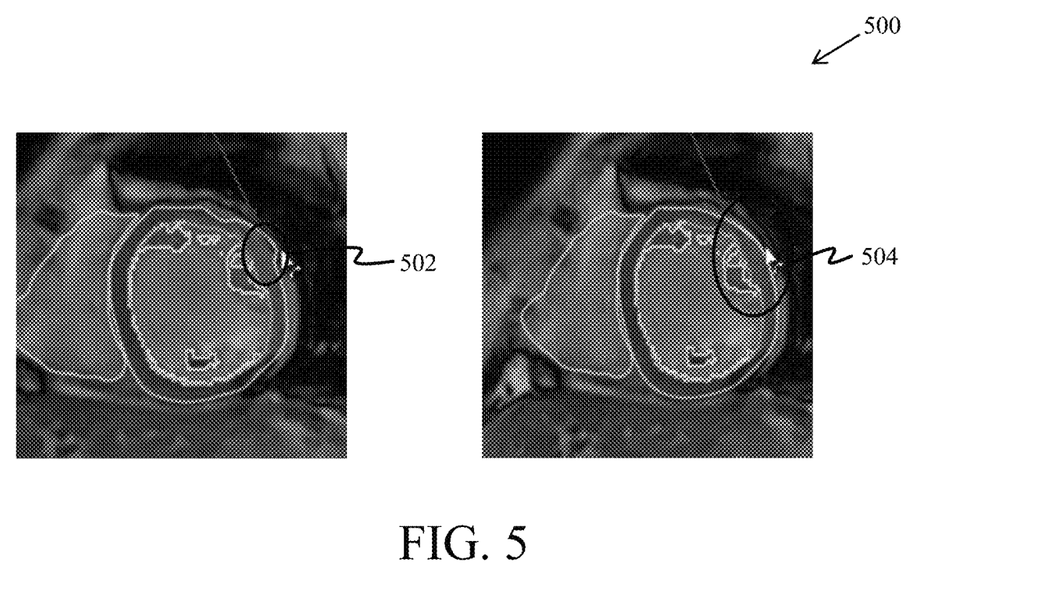
FIG. 5 is an exemplary image that illustrates a control radius of a circular region of control in accordance with an implementation of the present disclosure.

FIG. 5 is an exemplary image illustrating a control radius of a circular region of control, in accordance with an implementation of the present disclosure. With reference to FIG. 5, the image 500 shows the control radius of a circular region of control 502, 504. A control radius of the circular region of control 502, 504 can be manipulated by a user associated with a user device (not shown). In an instance, scrolling a mouse in an upward direction increases the control radius of the circular region of control 502. In another instance, scrolling a mouse in a downward direction decreases the control radius of the circular region of control 504.

Figure 6:
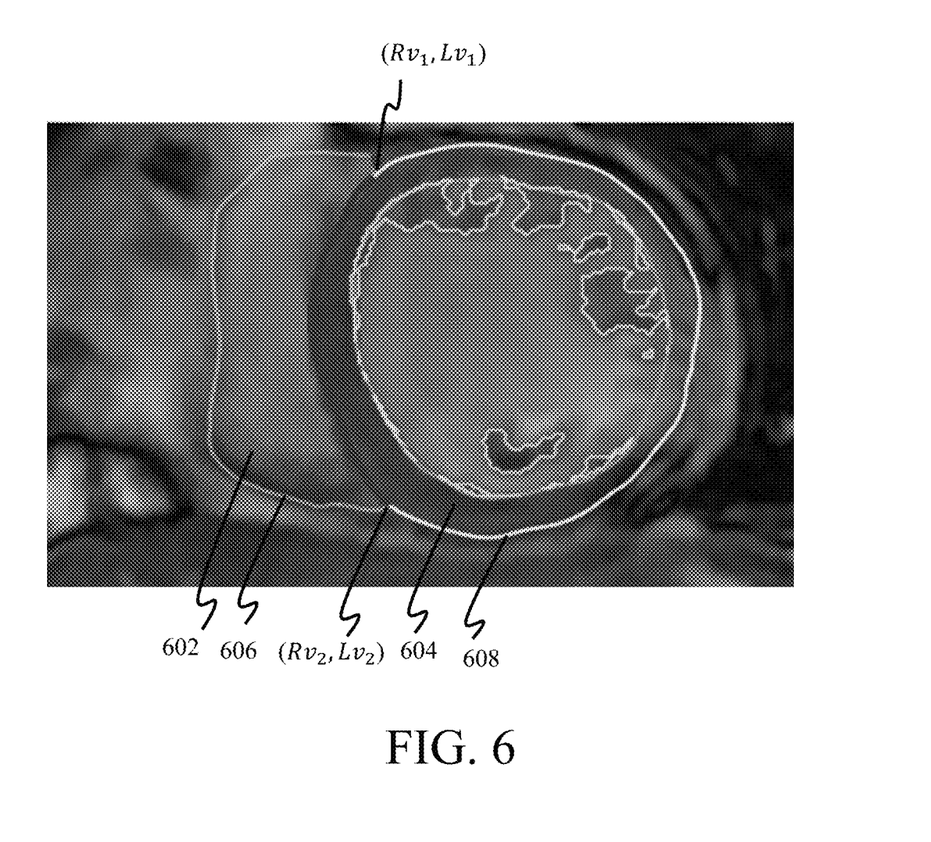
FIG. 6 is an exemplary image that illustrates updating another contour of another part in accordance with an implementation of the present disclosure.

FIG. 6 is an exemplary image illustrating updating another contour of another part, in accordance with an implementation of the present disclosure. With reference to FIG. 6, the image 600 represents a heart and the another part of the heart is at least one of: a right ventricle epicardium 602, a left ventricle epicardium 604. The first contour polygon 606 of the right ventricle epicardium 602 and the second contour polygon 608 of the left ventricle epicardium 604 are identified. Herein one of the first contour polygon 606 and the second contour polygon 608 overlaps other of the first contour polygon 606 and the second contour polygon 608. A first point pair ($RV_1$, $LV_1$) and a second point pair ($RV_2$, $LV_2$) are determined. Thereafter, an edited first contour polygon and an edited second contour polygon are generated by adjusting the first contour polygon 606 and the second contour polygon 608 based on the first point pair ($RV_1$, $LV_1$), the second point pair ($RV_2$, $LV_2$), and anatomical information.

As utilized herein, the term "exemplary" means serving as a non-limiting example, instance, or illustration. As utilized herein, the terms "for example," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The aspects of the disclosed embodiments also relate to the system as described above. Various embodiments and variants disclosed above apply mutatis mutandis to the system.

In accordance with an embodiment, when editing the contour for generating the edited contour, the at least one processor is configured to:
receive a second input indicative of a control point, wherein the control point lies either outside the contour or inside the contour;
receive a third input indicative of a control radius of a circular region of control that is centered at the control point, wherein the circular region of control includes at least a portion of the region of contour failure;
receive a fourth input indicative of two farthest points on the contour from the control point, wherein the two farthest points lie within the portion of the region of contour failure;
draw a spline from one of the two farthest points to another of the two farthest points through the control point;
replace the spline with uniformly sampled spline points; and
generate the edited contour by adjusting the contour to include the uniformly sampled spline points.

In accordance with another embodiment, wherein the least one anatomically recognizable structure is a heart and the another part of the heart is at least one of: an epicardium, an endocardium, and the at least one processor is further configured to update the another contour of the another part by:
identifying a first contour along a boundary of the epicardium and a second contour along a boundary of the endocardium;
comparing the first contour and the second contour with the anatomical information; and
when it is determined, based on the comparison, that a relative arrangement of the first contour and the second contour does not match a reference relative arrangement of the epicardium and the endocardium, adjusting at least one of the first contour, the second contour, to match the reference relative arrangement.

In accordance of yet another embodiment, wherein the at least one anatomically recognizable structure is a heart and the another part of the heart is at least one of: a right ventricle epicardium, a left ventricle epicardium, and the at least one processor is configured to update the another contour of the another part by:
identifying a first contour polygon of the right ventricle epicardium and the second contour polygon of the left ventricle epicardium, wherein one of the first contour polygon and the second contour polygon overlaps other of the first contour polygon and the second contour polygon;
determining a first point pair which includes a first point in the first contour polygon and a first point in the second contour polygon, said first points being closest to each other;
determining a second point pair by traversing along either the first contour polygon or the second contour polygon, wherein the second point pair includes a second point in the first contour polygon and a second point in the second contour polygon, said second points being closest to each other; and
generating an edited first contour polygon and an edited second contour polygon by adjusting the first contour polygon and the second contour polygon based on the first point pair, the second point pair, and the anatomical information.

In accordance with an embodiment, the at least one image is a time-series image, the at least one processor is further configured to update at least one succeeding image of the at least one image based on at least one of: the edited contour, the another contour that is updated, wherein when updating the at least one succeeding image, the at least one processor is configured to:

determine at least one of: an affected key point, an affected contour, near the region of contour failure, based on at least one of: the edited contour, the another contour that is updated; and move at least one: the affected key point, the affected contour, by a time-based distance in the at least one succeeding image, wherein the time-based distance is a distance that depends on a time interval between the at least one image and the at least one succeeding image.

In accordance with another embodiment, when updating the at least one succeeding image of the at least one image, the at least one processor is further configured to copy at least one of: the edited contour, the another contour that is updated, from the at least one image to the at least one succeeding image.

The aspects of the disclosed embodiments also relate to the computer program product as described above. Various embodiments and variants disclosed above apply mutatis mutandis to the computer program product.

Figure 7:
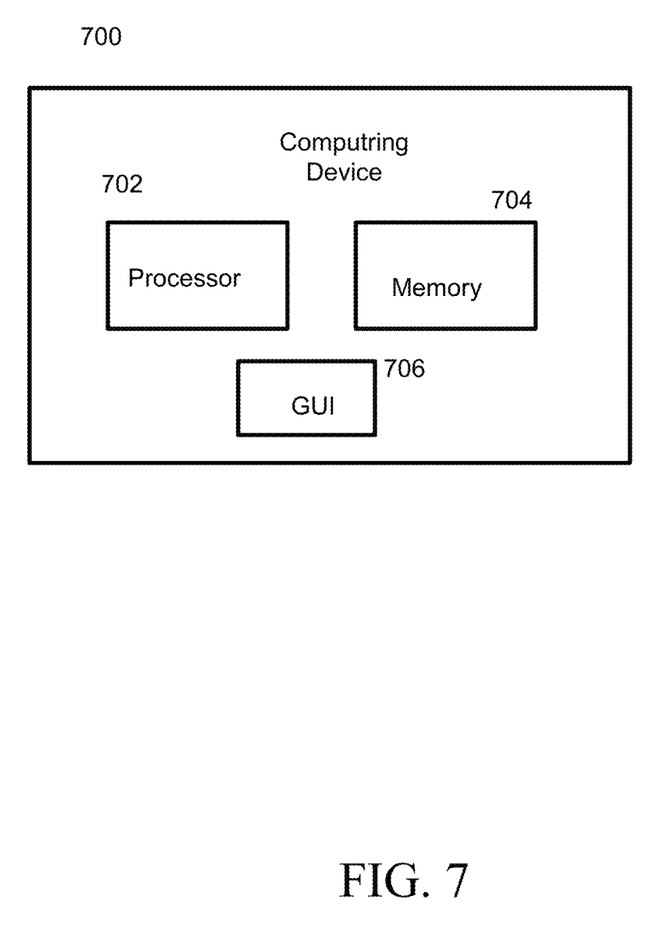
FIG. 7 illustrates an exemplary computing apparatus configured to implement aspects of the disclosed embodiments.

Referring to FIG. 7, further, many embodiments are described in terms of sequences of actions to be performed by, for example, elements of a computing apparatus or a device 700. As shown in the example of FIG. 7, the computing apparatus 700 can include one or more of a processor 702, a memory 704 and a graphical user interface 706, or any combination thereof. Although not shown, the computing apparatus 700 could be communicatively coupled to network or network interface to enable communication with the components and devices of the computing apparatus 700.

The processor 702 will generally comprise a hardware processor. Although only one processor 702 is generally described herein, the aspects of the disclosed embodiments are not so limited. In alternate embodiments, the computing apparatus 700 can include any suitable number of processors 702. Examples of the processor 702 can include, but are not limited to, a microprocessor, a microcontroller, a complex instruction set computing (CISC) microprocessor, a reduced instruction set (RISC) microprocessor, a very long instruction word (VLIW) microprocessor, or any other type of processing circuit.

In the example of FIG. 7, the computing apparatus 700 also includes or is communicatively coupled to the memory 704. The memory 704 may comprise suitable logic, circuitry, interfaces, and/or code that may be configured to store instructions executable by the processor 702. The memory 704 is further configured to store the sensor information, state information and predictions. The memory 704 may be further configured to store operating systems and associated applications of the processor 702. Examples of implementation of the memory 704 may include, but are not limited to, Random Access Memory (RAM), Read Only Memory (ROM), Hard Disk Drive (HDD), Flash memory, and/or a Secure Digital (SD) card. A computer readable storage medium of a computer program product for providing a non-transient memory may include, but is not limited to, an electronic storage device, a magnetic storage device, a visual storage device, an electromagnetic storage device, a semiconductor storage device, or any suitable combination of the foregoing.

It will be recognized that various actions described herein can be performed by specific circuits (for example, application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer-readable storage and/or media, having stored thereon, a machine code and/or a computer program having at least one code section executable by a machine and/or a computer, thereby causing the machine and/or computer to perform the steps as described herein for implementing an anatomy-aware contour editing method.

The aspects of the disclosed embodiments may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual server or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

The invention claimed is:

1. An anatomy-aware contour editing method comprising:
receiving, by at least one processor, at least one image, wherein the at least one image represents at least one anatomically recognizable structure;
identifying, by the at least one processor, a first image segment representing at least one part of the at least one anatomically recognizable structure;
annotating, by the at least one processor, the first image segment to generate a label of the at least one part;
drawing, by the at least one processor, at least one contour along a boundary of the at least one part;
receiving, by the at least one processor, a first input indicative of a region of contour failure, the first input being provided using a user device, and wherein the region of contour failure includes a portion of a contour that requires editing;
editing, by the at least one processor, the contour for generating an edited contour, based on the first input and anatomical information; and
updating, by the at least one processor, another contour of another part of the at least one anatomically recognizable structure based on the edited contour, wherein the another part is anatomically related to the at least one part.

2. The anatomy-aware contour editing method of claim 1, wherein editing the contour to generate the edited contour comprises:
receiving, by the at least one processor, a second input indicative of a control point, the second input being provided using a user device, and wherein the control point lies either outside the contour or inside the contour;
receiving, by the at least one processor, a third input indicative of a control radius of a circular region of control that is centered at the control point, the third input being provided using a user device, and wherein the circular region of control includes at least a portion of the region of contour failure;
receiving, by the at least one processor, a fourth input indicative of two farthest points on the contour from the control point, the fourth input being provided using a user device, and wherein the two farthest points lie within the portion of the region of contour failure;
drawing, by the at least one processor, a spline from one of the two farthest points to another of the two farthest points through the control point;
replacing, by the at least one processor, the spline with uniformly sampled spline points; and
generating, by the at least one processor, the edited contour by adjusting the contour to include the uniformly sampled spline points.

3. The anatomy-aware contour editing method of claim 2, wherein the control point emulates a magnet and the control radius is indicative of a strength of an external magnetic field of the magnet.

4. The anatomy aware contour editing method of claim 2, wherein the at least one anatomically recognizable structure is a heart and the another part of the heart is at least one of: an epicardium, an endocardium.

5. The anatomy aware contour editing method of claim 4, wherein updating the another contour of the another part comprises:
identifying, by the at least one processor, a first contour along a boundary of the epicardium and a second contour along a boundary of the endocardium;
comparing, by the at least one processor, the first contour and the second contour with the anatomical information; and
when it is determined, based on the comparison, that a relative arrangement of the first contour and the second contour does not match a reference relative arrangement of the epicardium and the endocardium, adjusting, by the at least one processor, at least one of: the first contour, the second contour, to match the reference relative arrangement.

6. The anatomy-aware contour editing method of claim 4, wherein the another part of the heart is at least one papillary muscle, and wherein the step of updating the another contour of the another part comprises:
identifying, by the at least one processor, a third contour polygon of a given papillary muscle; and adjusting, by the at least one processor, a size of the third contour polygon based on a predefined size threshold algorithm.

7. The anatomy-aware contour editing method of claim 2, wherein the at least one anatomically recognizable structure is a heart and the another part of the heart is at least one of: a right ventricle epicardium, a left ventricle epicardium.

8. The anatomy-aware contour editing method of claim 7, wherein updating the another contour of the another part comprises:
identifying, by the at least one processor, a first contour polygon of the right ventricle epicardium and the second contour polygon of the left ventricle epicardium, wherein one of the first contour polygon and the second contour polygon overlaps other of the first contour polygon and the second contour polygon;
determining, by the at least one processor, a first point pair which includes a first point in the first contour polygon and a first point in the second contour polygon, said first points being closest to each other;
determining, by the at least one processor, a second point pair by traversing along either the first contour polygon or the second contour polygon, wherein the second point pair includes a second point in the first contour polygon and a second point in the second contour polygon, said second points being closest to each other; and
generating, by the at least one processor, an edited first contour polygon and an edited second contour polygon by adjusting the first contour polygon and the second contour polygon based on the first point pair, the second point pair, and the anatomical information.

9. The anatomy-aware contour editing method of claim 1, wherein the at least one image is a time-series image, the method further comprising updating at least one succeeding image of the at least one image based on at least one of: the edited contour, the another contour that is updated, wherein the step of updating the at least one succeeding image comprises:
determining, by the at least one processor, at least one of: an affected key point, an affected contour, near the region of contour failure, based on at least one of: the edited contour, the another contour that is updated; and
moving at least one: the affected key point, the affected contour, by a time-based distance in the at least one succeeding image, wherein the time-based distance is a distance that depends on a time interval between the at least one image and the at least one succeeding image.

10. The anatomy-aware contour editing method of claim 9, wherein the step of updating the at least one succeeding image of the at least one image further comprises copying, by the at least one processor, at least one of: the edited contour, the another contour that is updated, from the at least one image to the at least one succeeding image.

11. The anatomy aware contour editing method of claim 1, wherein a given input is provided using a user device, the given input being at least one of: a touch input, a click input, a click and drag input, a text input.

12. The anatomy aware contour editing method of claim 1, further comprising accessing the anatomical information from a data repository where the anatomical information is stored.

13. The anatomy aware contour editing method of claim 12, wherein the anatomical information comprises at least one of: a dimension, a thickness value, a boundary, a relative size, a predefined size threshold, an arrangement, an anatomical relation of a given part with the at least one part, of the at least one part of the at least one anatomically recognizable structure.

14. A system for implementing an anatomy-aware contour editing method, the system comprising:
a user device that is configured to enable a user to at least provide inputs; and
at least one processor communicably coupled to the user device, wherein the at least one processor is configured to:
receive at least one image, wherein the at least one image represents at least one anatomically recognizable structure;
identify a first image segment representing at least one part of the at least one anatomically recognizable structure;
annotate the first image segment to generate a label of the at least one part;
draw at least one contour along a boundary of the at least one part;
receive a first input indicative of a region of contour failure, wherein the region of contour failure includes a portion of a contour that requires editing;
edit the contour to generate an edited contour, based on the first input and anatomical information; and
update another contour of another part of the at least one anatomically recognizable structure based on the edited contour, wherein the another part is anatomically related to the at least one part.

15. The system of claim 14, wherein when editing the contour for generating the edited contour, the at least one processor is configured to:
receive a second input indicative of a control point, wherein the control point lies either outside the contour or inside the contour;
receive a third input indicative of a control radius of a circular region of control that is centered at the control point, wherein the circular region of control includes at least a portion of the region of contour failure;
receive a fourth input indicative of two farthest points on the contour from the control point, wherein the two farthest points lie within the portion of the region of contour failure;
draw a spline from one of the two farthest points to another of the two farthest points through the control point;
replace the spline with uniformly sampled spline points; and
generate the edited contour by adjusting the contour to include the uniformly sampled spline points.

16. The system of claim 15, wherein the least one anatomically recognizable structure is a heart and the another part of the heart is at least one of: an epicardium, an endocardium, and the at least one processor is further configured to update the another contour of the another part by:
identifying a first contour along a boundary of the epicardium and a second contour along a boundary of the endocardium;
comparing the first contour and the second contour with the anatomical information; and
when it is determined, based on the comparison, that a relative arrangement of the first contour and the second contour does not match a reference relative arrangement of the epicardium and the endocardium, adjusting at least one of the first contour, the second contour, to match the reference relative arrangement.

17. The system of claim 15, wherein the at least one anatomically recognizable structure is a heart and the another part of the heart is at least one of: a right ventricle epicardium, a left ventricle epicardium, and the at least one processor is configured to update the another contour of the another part by:
- identifying a first contour polygon of the right ventricle epicardium and the second contour polygon of the left ventricle epicardium, wherein one of the first contour polygon and the second contour polygon overlaps other of the first contour polygon and the second contour polygon;
- determining a first point pair which includes a first point in the first contour polygon and a first point in the second contour polygon, said first points being closest to each other;
- determining a second point pair by traversing along either the first contour polygon or the second contour polygon, wherein the second point pair includes a second point in the first contour polygon and a second point in the second contour polygon, said second points being closest to each other; and
- generating an edited first contour polygon and an edited second contour polygon by adjusting the first contour polygon and the second contour polygon based on the first point pair, the second point pair, and the anatomical information.

18. The system of claim 14, wherein the at least one image is a time-series image, the at least one processor is further configured to update at least one succeeding image of the at least one image based on at least one of: the edited contour, the another contour that is updated, wherein when updating the at least one succeeding image, the at least one processor is configured to:
- determine at least one of: an affected key point, an affected contour, near the region of contour failure, based on at least one of: the edited contour, the another contour that is updated; and
- move at least one: the affected key point, the affected contour, by a time-based distance in the at least one succeeding image, wherein the time-based distance is a distance that depends on a time interval between the at least one image and the at least one succeeding image.

19. The system of claim 18, wherein when updating the at least one succeeding image of the at least one image, the at least one processor is further configured to copy at least one of: the edited contour, the another contour that is updated, from the at least one image to the at least one succeeding image.

20. A computer program product comprising a non-transitory computer-readable program instructions, which when executed by a hardware processor of a computing device, are configured to cause the computing device to:
- receive at least one image, wherein the at least one image represents at least one anatomically recognizable structure;
- identify a first image segment representing at least one part of the at least one anatomically recognizable structure;
- annotate the first image segment to generate a label of the at least one part;
- draw at least one contour along a boundary of the at least one part;
- receive a first input indicative of a region of contour failure, the first input being provided using a user device, and wherein the region of contour failure includes a portion of a contour that requires editing;
- edit the contour for generating an edited contour, based on the first input and anatomical information; and
- update another contour of another part of the at least one anatomically recognizable structure based on the edited contour, wherein the another part is anatomically related to the at least one part.

* * * * *